US007668766B1

(12) United States Patent  (10) Patent No.: US 7,668,766 B1
Goodwin, III et al.  (45) Date of Patent: Feb. 23, 2010

(54) SYSTEM AND METHOD OF PROCESSING PAYMENT OF BILLS FROM MULTIPLE BILL PROVIDERS

(75) Inventors: John C. Goodwin, III, Suwanee, GA (US); Robert Randall Schlieker, Arlington, TX (US)

(73) Assignee: NCR Corporation, Dayton, OH (US)

( * ) Notice: Subject to any disclaimer, the term of this patent is extended or adjusted under 35 U.S.C. 154(b) by 2059 days.

(21) Appl. No.: 09/950,118

(22) Filed: Sep. 10, 2001

(51) Int. Cl.
*G06Q 40/00* (2006.01)
(52) U.S. Cl. ............................. 705/35; 705/39; 705/41; 705/43
(58) Field of Classification Search .................. 705/35, 705/39, 41, 43; 902/8, 12, 15, 17
See application file for complete search history.

(56) References Cited

U.S. PATENT DOCUMENTS 5,987,439 A * 11/1999 Gustin et al. .................. 705/43
2002/0023055 A1 * 2/2002 Antognini et al. ............. 705/40

OTHER PUBLICATIONS

Easy bills payment via Telekom kiosks Malay Mail. Kuala Lumpur: Jul. 17, 2001. p. 14.*

7-Eleven, Inc. Tests New, Automated Financial Services and Web-Enabled Kiosks; 36 Stores Are Part of Expanded Pilot Program in Ft. Myers/Naples PR Newswire. New York: Jun. 7, 2001. p. 1.*

Cingular Introduces NCR Self-Service Bill Payment Web Kiosks PR Newswire. New York: Dec. 18, 2000. p. 1.*

* cited by examiner

*Primary Examiner*—Lalita M Hamilton
(74) *Attorney, Agent, or Firm*—Paul W. Martin; Maginot, Moore & Beck LLP

(57) ABSTRACT

A system for processing payment of bills from multiple bill providers which establishes connections to bill provider computers through APIs unique to each bill provider. The system includes a display for displaying a list of bill providers, an input device for recording customer selections of a number of the bill providers from the list, a payment accepting device, such as a check reader, card reader, or cash acceptor, and a processor for establishing connections to computers of the bill providers through the APIs which are resident on the kiosk in response to the customer selections, for sending customer identification information to the computers, for receiving and displaying customer account information from the computers, for recording the payments from the payment accepting device, and for sending payment information to the computers.

16 Claims, 3 Drawing Sheets

SYSTEM AND METHOD OF PROCESSING PAYMENT OF BILLS FROM MULTIPLE BILL PROVIDERS

BACKGROUND OF THE INVENTION

The present invention relates to self-service kiosks and more specifically to a system and method of processing payment of bills from multiple bill providers.

Kiosks provide a publicly accessible computing platform for displaying World Wide Web (web) pages and other web-delivered content from web sites. Kiosks may be located within a retailer's transaction establishment or elsewhere, such as in shopping malls. Kiosks may be easily networked to web sites using the TCP/IP protocol. Web pages from web sites may be displayed using known and available web software, such as Microsoft® Internet Explorer software.

Customers seek an effective way to pay bills. Customers receive bills from multiple bill providers and must individually process payments to these bill providers.

Therefore, it would be desirable to provide a kiosk which can process payment of bills from multiple bill providers.

SUMMARY OF THE INVENTION

In accordance with the teachings of the present invention, a system and method of processing payment of bills from multiple bill providers is provided.

The system includes a display for displaying a list of bill providers, an input device for recording customer selections of a number of the bill providers from the list, a payment accepting device, such as a check reader, card reader, or cash acceptor, and a processor for establishing connections to computers of the bill providers through the APIs which are resident on the kiosk in response to the customer selections, for sending customer identification information to the computers, for receiving and displaying customer account information from the computers, for recording the payments from the payment accepting device, and for sending payment information to the computers.

A method of processing a payment of a bill includes the steps of recording a customer selection of a bill provider from a list of bill providers displayed by a bill payment computer, connecting to a computer of the bill provider through an API of the bill provider resident on the bill payment computer, recording customer identification information by the bill payment computer, sending customer identification information to the computer of the bill provider by the bill payment computer, receiving and displaying customer account information from the computer of the bill provider by the bill payment computer, recording the payment by the bill payment computer, and sending payment information to the computer of the bill provider by the bill payment computer.

It is accordingly an object of the present invention to provide a system and method of processing payment of bills from multiple bill providers.

It is another object of the present invention to provide a kiosk which can process payment of bills from multiple bill providers.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
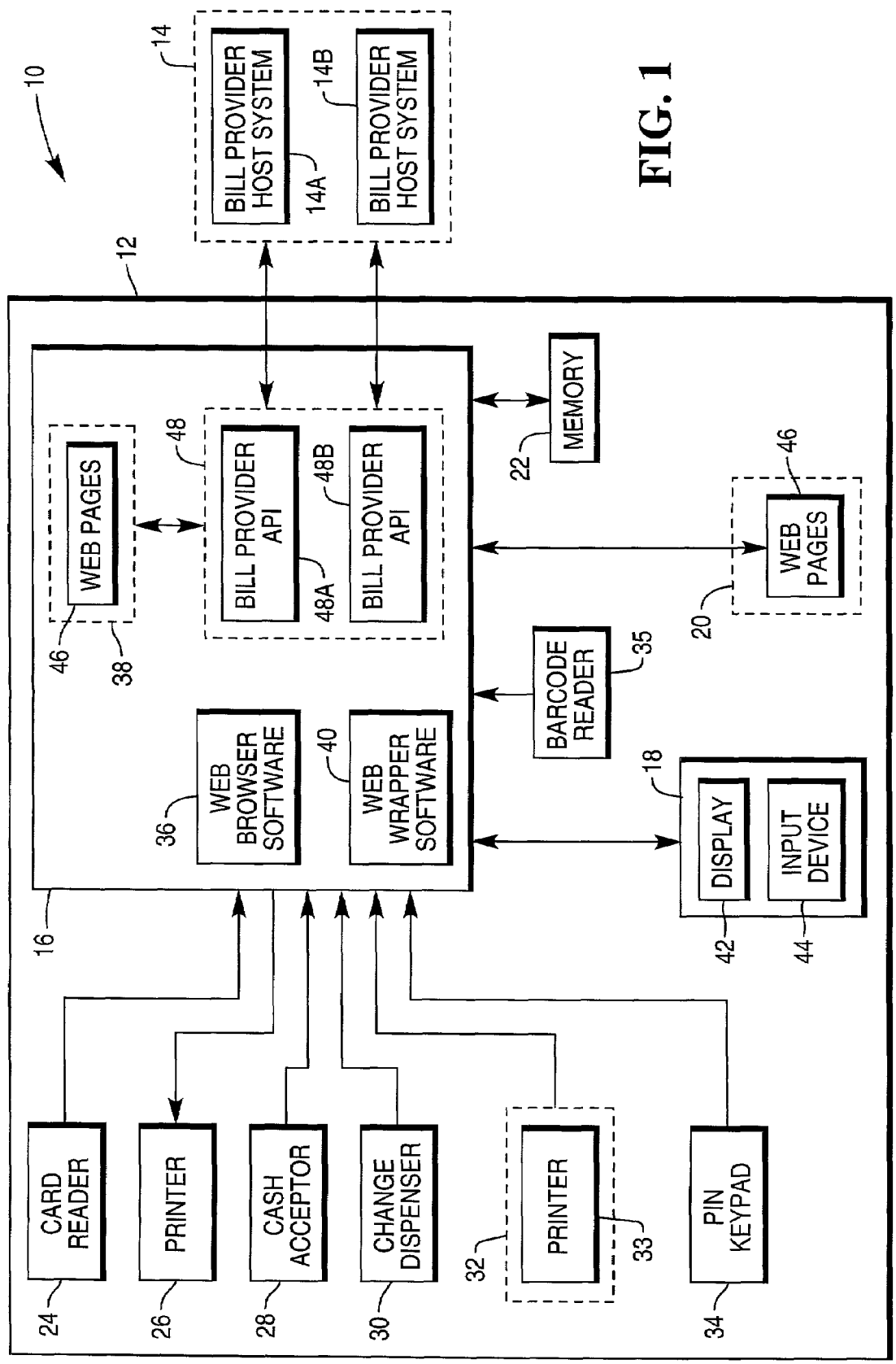
FIG. 1 is a block diagram of a bill paying system.

Turning now to FIG. 1, system 10 includes kiosk 12 and bill provider host systems 14. Kiosk 12 is preferably located in a bill provider's establishment or a public place. Kiosk 12 may include an NCR 7401 computer.

Kiosk 12 primarily includes processor 16, touch screen 18, memory 22, and storage medium 20. Kiosk 12 additionally includes a number of peripherals, including card reader 24, printer 26, cash acceptor 28, cash dispenser 30, check reader 32, and personal identification number (PIN) keypad 34.

Processor 16 executes bill payment application 38, which records bill payer information, retrieves bill information from bill provider host systems 14, displays instructions for completing payment of bills to bill providers, records bill payment via card reader 24, cash acceptor 28, or check reader 32, and dispenses change through cash dispenser 30.

In order to take cash or check payments, bill payment application 38 must also provide balancing functions, just like a point-of-sale terminal. This helps the kiosk owner create its deposit slip and balance the kiosk.

Bill payment application 38 communicates with bill provider host systems 14 over a network connection, such as one which uses the TCP/IP protocol. Kiosk 12 may be connected to the World Wide Web (web) and may obtain web content from web servers. Bill provider host systems 14 may be external web servers.

Bill payment application 38 interacts with each bill provider host system 14 through system-specific application programming interfaces (APIs) 48. APIs 48 include a different API for each bill provider host system.

Advantageously, use of multiple APIs allows a bill payer to use a single kiosk to pay bills from a plurality of bill providers through corresponding APIs. APIs 48 may be developed and provided by the bill providers or developed otherwise with system information provided by the bill providers.

Bill payment application 38 determines what messages need to be constructed and where they need to be sent. Following receipt of payment, bill payment application 38 sends a message to bill provider host system 14 containing the amount of the payment. Bill provider host system 14 credits the payment against the bill.

Processor 16 may also execute web browser software 36 and web wrapper software 40.

Web browser software 36 allows an operator to display information in a format established by the World Wide Web (WWW or "web"). Bill payment application 38 may be written as a web application which displays bill and payment information in the form of web pages 46, although bill payment application may also be a non-web application and operate without web browser software 36 and web wrapper software 40. Web pages 46 may be written using hypertext markup language (HTML) or other suitable web page language.

Web browser software 36 may include commercially available web browser software, such as Microsoft® Internet Explorer web browser software. Microsoft® Internet Explorer web browser software is configured into a kiosk operation using a "-k" command line option. This option hides toolbars and menu bars to prevent operator access to those functions.

Web browser software 36 may also display a start or "home" page within web pages 46 which operates as a default page from which kiosk operation begins and to which operation returns when an operator is finished using kiosk 12. Web browser software 36 may also facilitate purchase of goods from retailers and may also serve to display advertisement when not in use.

Web wrapper software 40 provides security functions. During operation, web wrapper software 40 prevents an operator from accessing kiosk files, or other applications, or the operating system software, or basic input-output system (BIOS) firmware, and prevents the operator from causing kiosk 12 to reboot.

Touch screen 18 includes display 42 and input device 44. Display 42 and input device 44 may also be separate units. Input device 44 may record bill provider selection information from a bill payer.

Storage medium 20 stores web pages 46 for use by bill payment application 38 and other applications. Some of web pages 46 may be obtained from web servers.

Memory 22 is used by processor 16 to store executed program information.

Card reader 24 reads loyalty, credit, debit, SMART, and/or other types of cards carried by a bill payer. Card reader 24 may record payment information from a bill payer.

Printer 26 prints receipt information.

Cash acceptor 28 accepts cash in multiple denominations.

Cash dispenser 30 dispenses change.

Check reader 32 reads checks and includes a magnetic ink character (MICR) reader. Check reader 32 also includes printer 33 for printing information on checks.

PIN keypad 34 records PIN numbers for debit card transactions.

Kiosk 12 may additionally include barcode reader 35, which may be used to scan barcode labels on bills. The barcode labels contain bill payer identification and account information.

Bill provider host systems 14 are associated with different bill providers. Bill provider host systems 14 receive payment information from kiosk 12, credit payments against the bills, and report successful receipt of payment information back to bill payment application 38.

Figure 2A:
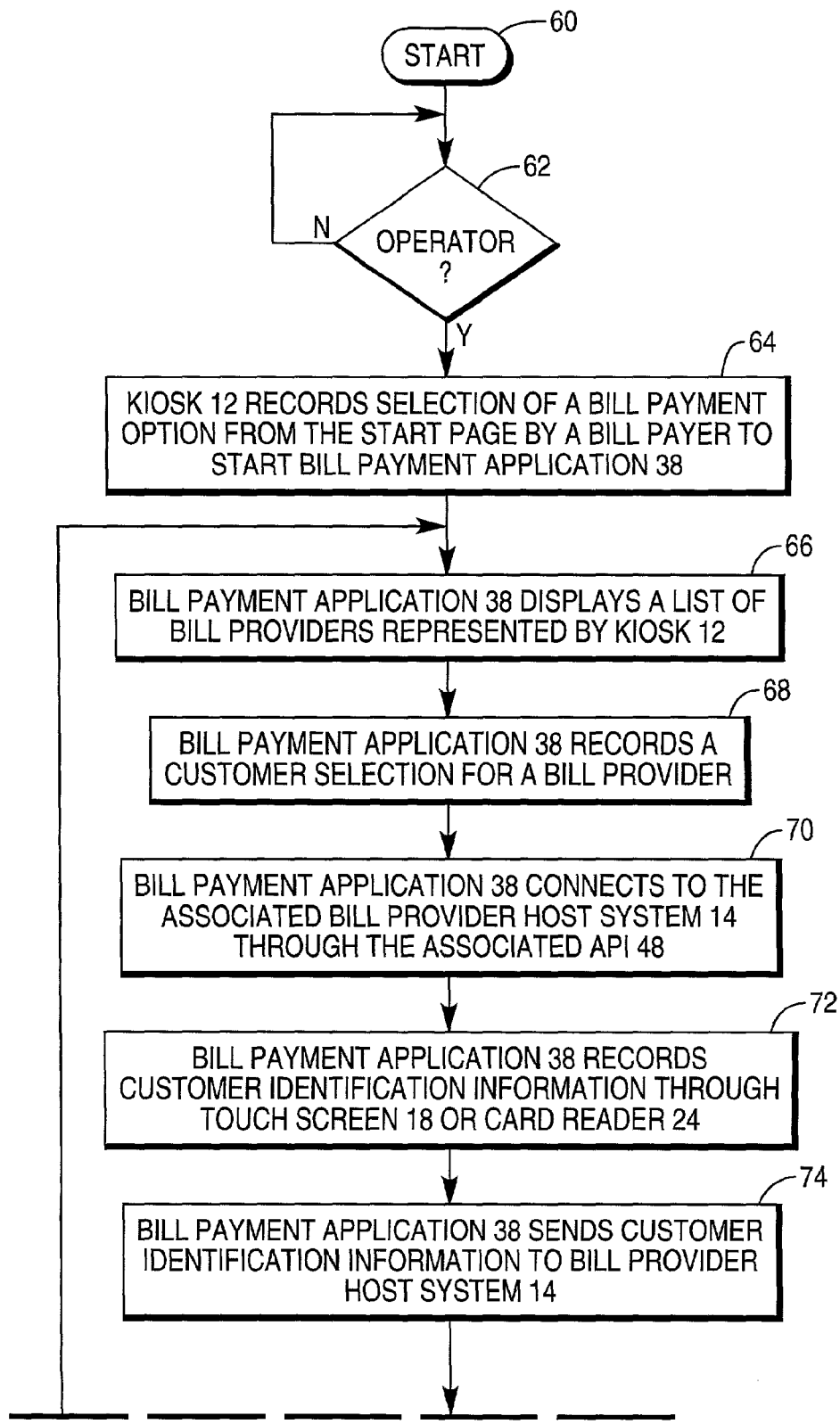
FIGS. 2A and 2B form a flow diagram illustrating operation of the bill paying system.
Figure 2B:
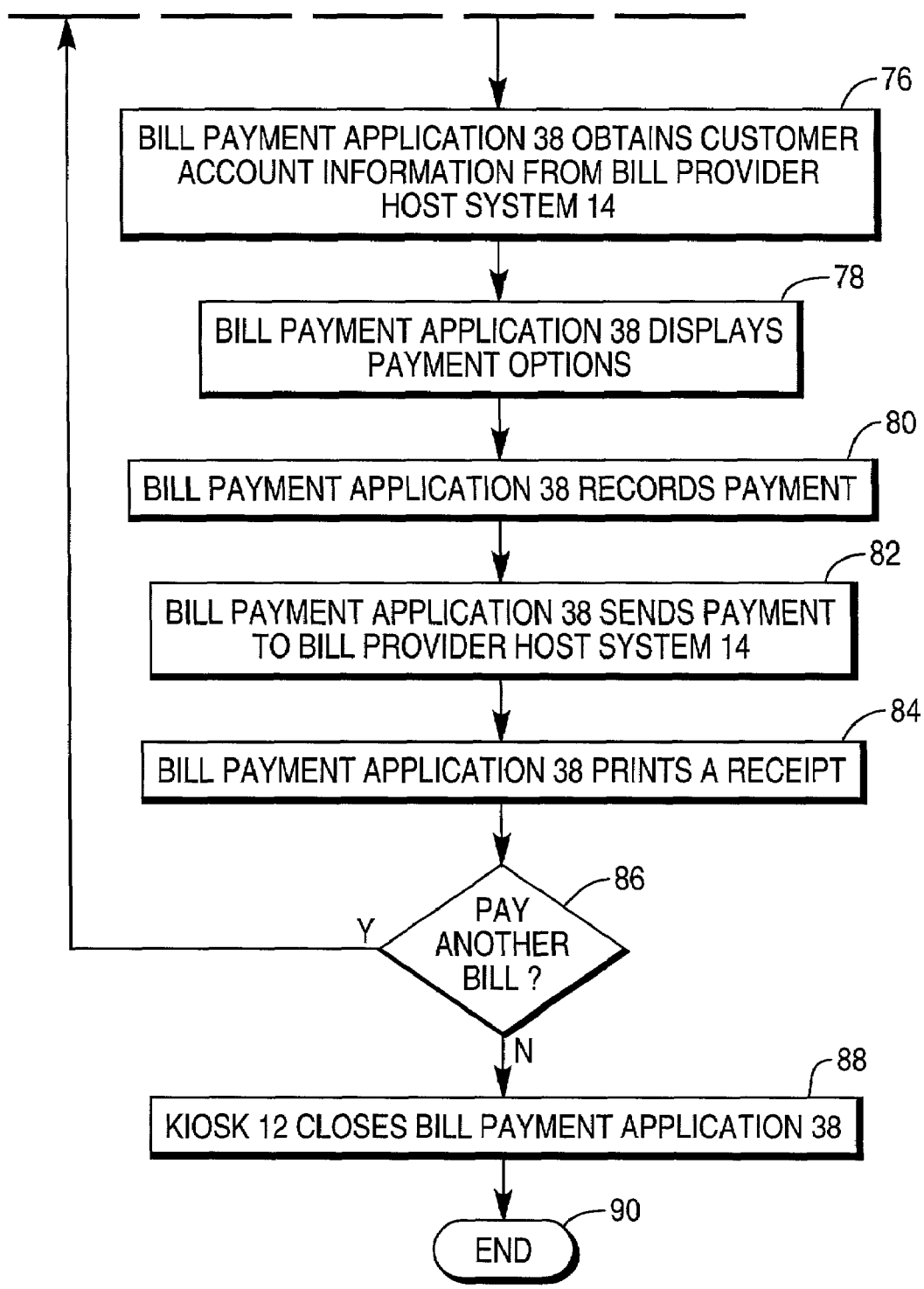

Turning now to FIGS. 2A and 2B, operation of kiosk 12 is illustrated in detail beginning with START 60.

In step 62, kiosk 12 waits for a user to operate kiosk 12. During this time, kiosk 12 may be displaying advertisements or other web content.

In step 64, kiosk 12 records selection of a bill payment option from the start page by a bill payer to start bill payment application 38.

In step 66, bill payment application 38 displays a list of bill providers represented by kiosk 12.

In step 68, bill payment application 38 records a customer selection for a bill provider.

In step 70, bill payment application 38 connects to the associated bill provider host system 14 through the associated API 48.

In step 72, bill payment application 38 records customer identification information through touch screen 18, card reader 24, or barcode reader 35.

In step 74, bill payment application 38 sends customer identification information to bill provider host system 14.

In step 76, bill payment application 38 obtains account information from bill provider host system 14. Bill payment application 38 also determines what payments methods are valid for this bill payer or bill provider. For example, if a bill payer has written too many bad checks, then bill provider host system 14 may block payment by check for this bill payer.

In step 78, bill payment application 38 displays payment options.

In step 80, bill payment application 38 records payment.

In step 82, bill payment application 38 sends payment to bill provider host system 14. Bill provider host system 14 credits the bill payer account and sends a message to bill payment application 38 indicating successful receipt of payment.

In step 84, bill payment application 38 prints a receipt.

In step 86, bill payment application 38 displays a message indicating that payment is completed and determines whether the bill payer wishes to pay another bill. If the bill payer wishes to pay another bill, operation returns to step 66 to select another bill provider following operator selection. If not, operation proceeds to step 88 following operator selection.

In step 88, kiosk 12 closes bill payment application 38.

Operation ends at step 90. At this point the bill payer may use kiosk 12 for other purposes or leave. After the bill payer has left, operation returns to step 62 to await another user.

Although the present invention has been described with particular reference to certain preferred embodiments thereof, variations and modifications of the present invention can be effected within the spirit and scope of the following claims.

We claim:

1. A method of processing a payment of a bill comprising the steps of:
    displaying a list of bill providers on a bill payment computer;
    recording a customer selection of a bill provider from a list of bill providers displayed by a bill payment computer;
    connecting to a computer of the bill provider through an API of the bill provider selected on the bill payment computer;
    recording customer identification information by the bill payment computer;
    sending customer identification information to the computer of the bill provider by the bill payment computer;
    receiving and displaying customer account information from the computer of the bill provider by the bill payment computer;
    recording the payment by the bill payment computer; and
    sending payment information to the computer of the bill provider by the bill payment computer.

2. The method of processing a payment of a bill as recited in claim 1, wherein the step of displaying a list of bill providers on a bill payment computer comprises the step of displaying a list of a plurality of different bill providers on a bill payment computer.

3. The method of processing a payment of a bill as recited in claim 1, wherein the step of displaying a list of bill providers on a bill payment computer comprises the step of displaying a list of a plurality of different bill providers on a kiosk.

4. The method of processing a payment of a bill as recited in claim 1, wherein the step of displaying a list of bill providers on a bill payment computer comprises the step of displaying a list of a plurality of different bill providers on a touch screen.

5. A method of processing a payment of a bill comprising the steps of:
    displaying a list of a plurality of different bill providers by a kiosk;
    recording a customer selection of one of the bill providers by an input device of the kiosk;

connecting to a computer of the one bill provider through an API of the bill provider selected on the kiosk;

recording customer identification information by the kiosk;

sending customer identification information to the computer by the kiosk;

receiving and displaying customer account information from the computer by the kiosk;

recording the payment by the kiosk;

sending payment information to the computer by the kiosk;

printing a receipt by a printer of the kiosk; and displaying a message indicating that the computer has received the payment by the kiosk.

6. The method of processing a payment of a bill as recited in claim 5, wherein the step of displaying a list of a plurality of different bill providers by a kiosk comprises the step of displaying a list of a plurality of different bill providers on a touch screen.

7. The method of processing a payment of a bill as recited in claim 5, wherein the step of recording a customer selection of one of the bill providers by an input device of the kiosk comprises the step recording a customer selection of one of the bill providers on a touch screen.

8. The method of processing a payment of a bill as recited in claim 5, wherein the step of sending payment information to the computer by the kiosk comprises sending payment information to the computer by one of a cash acceptor, a check reader and a card reader.

9. A bill payment system comprising:

a display for displaying a list of a plurality of different bill providers;

an input device for recording customer selections of a number of the bill providers from the list;

means for accepting payments of bills from the bill providers by a bill payer; and a processor for establishing connections to computers of the bill providers through APIs which are unique to each of the bill providers and resident on the kiosk in response to the customer selections, for sending customer identification information to the computers, for receiving and displaying customer account information from the computers, for recording the payments from the payment accepting means, and for sending payment information to the computers.

10. The bill payment system as recited in claim 9, wherein the display comprises a touch screen.

11. The bill payment system as recited in claim 9, wherein the input device comprises a touch screen.

12. The bill payment system as recited in claim 9, wherein the means for accepting payments of bills comprises one of a cash acceptor, a check reader and a card reader.

13. A bill payment kiosk comprising:

a touch screen for displaying a list of a plurality of different bill providers and for recording customer selections of a number of the bill providers from the list;

means for accepting payments of bills from the bill providers by a bill payer; and a processor for establishing connections to computers of the bill providers through APIs which are unique to each of the bill providers and resident on the kiosk in response to the customer selections, for sending customer identification information to the computers, for receiving and displaying customer account information from the computers, for recording the payments from the payment accepting means, and for sending payment information to the computers.

14. The kiosk as recited in claim 13, wherein the payment accepting means comprises:

a check reader.

15. The kiosk as recited in claim 13, wherein the payment accepting means comprises:

a card reader.

16. The kiosk as recited in claim 13, wherein the payment accepting means comprises:

a cash acceptor.

* * * * *

UNITED STATES PATENT AND TRADEMARK OFFICE
CERTIFICATE OF CORRECTION

PATENT NO. : 7,668,766 B1  Page 1 of 1
APPLICATION NO. : 09/950118
DATED : February 23, 2010
INVENTOR(S) : Goodwin, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3178 days.

Signed and Sealed this

Twenty-eighth Day of December, 2010

David J. Kappos
*Director of the United States Patent and Trademark Office*